(12) United States Patent
Gunturi et al.

(10) Patent No.: US 7,865,870 B2
(45) Date of Patent: Jan. 4, 2011

(54) AUTOMATIC CONTENT COMPLETION OF VALID VALUES FOR METHOD ARGUMENT VARIABLES

(75) Inventors: Srimanth Gunturi, Raleigh, NC (US); Richard L. Kulp, Cary, NC (US); Gili Mendel, Cary, NC (US); Rebecca J. Schaller, Cary, NC (US); Peter A. Walker, Fuquay-Varina, NC (US); Joseph R. Winchester, Otterbourne (GB)

(73) Assignee: International Business Machines Corporation, Armonk, NY (US)

( * ) Notice: Subject to any disclaimer, the term of this patent is extended or adjusted under 35 U.S.C. 154(b) by 1560 days.

(21) Appl. No.: 11/190,132

(22) Filed: Jul. 26, 2005

(65) Prior Publication Data

US 2006/0026559 A1    Feb. 2, 2006

(30) Foreign Application Priority Data

Jul. 29, 2004   (GB) ................................. 0416867.0

(51) Int. Cl.
   *G06F 9/44*    (2006.01)
(52) U.S. Cl. ...................................... 717/106; 717/110
(58) Field of Classification Search .................. 717/106, 717/110
   See application file for complete search history.

(56) References Cited

U.S. PATENT DOCUMENTS

| | | | |
|---|---|---|---|
| 6,026,233 A | 2/2000 | Shulman et al. | |
| 6,305,008 B1* | 10/2001 | Vaidyanathan et al. | 717/111 |
| 6,311,323 B1 | 10/2001 | Shulman et al. | |
| 6,587,122 B1 | 7/2003 | King | |
| 7,313,784 B2* | 12/2007 | Hawley et al. | 717/110 |
| 2004/0031017 A1 | 2/2004 | Vaidyanathan et al. | |
| 2004/0039988 A1* | 2/2004 | Lee et al. | 715/505 |
| 2006/0130027 A1 | 6/2006 | Hutchison et al. | |
| 2008/0098352 A1* | 4/2008 | Hawley et al. | 717/109 |

* cited by examiner

*Primary Examiner*—Philip Wang
(74) *Attorney, Agent, or Firm*—David A. Mims, Jr.

(57) ABSTRACT

The invention is directed to a method which derives from metadata definitions the allowable values for a method argument, where the allowable values are a subset or a restricted set of values from a defined range of values for that type of method argument. The subset of allowable values is then converted into a fragment of source code that can be used to initialize the argument variable with one of the allowable values when the method is invoked. The fragment of source code is inserted into the source code for that method argument using an editor tool. A system for implementing the method may comprise an integrated development environment (IDE) program.

16 Claims, 6 Drawing Sheets

AUTOMATIC CONTENT COMPLETION OF VALID VALUES FOR METHOD ARGUMENT VARIABLES

FIELD OF THE INVENTION

The present invention concerns the development of computer software and more particularly concerns the automatic content completion of valid values for method argument variables.

BACKGROUND TO THE INVENTION

An integrated development environment (IDE) is a programming environment that has been packaged as an application program, typically consisting of a code editor, a compiler or parser, a debugger and a graphical user interface (GUI) builder. The IDE may be a stand-alone application or it may be included as part of one or more existing and compatible applications. IDEs provide a user-friendly framework for developing many modern object oriented programming languages such as Visual Basic, C, C++, Pascal and Java.

IDEs commonly provide editing tools to assist software developers in editing/writing source code files or portions of source code for such files. Code assist or statement completion is a powerful editing tool that allows a developer to choose from a list of contextually selected candidate completion statements. A chosen candidate completion statement is then automatically written into the source code file or source code portion at the position of the editor tool cursor, for example. Such a tool reduces the errors associated with the developer manually writing the code. It also removes the need for the developer to either attempt to recall code information from memory or look it up from other sources which, in the latter case, might require the developer to flip between the editing tool window and windows containing the sought after information.

A problem with the code assist or statement completion editing tool is that it derives the contents of the candidate completion statement list from the definition of the shape of the class for which the completion is being performed. It does not, however, indicate whether any of the candidate completion statements in the list is restricted further by information not present in the class definition. For example, it does not provide any information for the case where one of said possible completion statements in the pop-up list includes a method argument having a variable that, on method invocation, can receive, as a valid passed-in value, a value belonging to a small subset of a range of values defined for that type of argument. The subset of valid passed-in values may comprise the only values that are acceptable to the application programming interface (API) of the class.

OBJECT OF THE INVENTION

It is an object of the invention to mitigate and/or obviate problems associated with known code assist or statement completion editing tools.

It is a further object of the invention to provide a method, a system, a computer and a machine readable medium for automatic content completion of valid values for method argument variables.

SUMMARY OF THE INVENTION

According to a first aspect of the invention, there is provided a method for developing source code for a computer program; the method being characterised in that it comprises the steps of: accessing a portion of source code through a code editor; identifying code comprising a method argument, said method argument being of a type that has a defined range of values; and inserting code into said method argument code, said inserted code defining allowable values for said method argument, said allowable values comprising a subset of said defined range of values for that type of method argument.

An advantage of the method in accordance with the invention over known code assist or completion statement software development tools is that by modifying the source code of method arguments to effectively restrict them to valid values for the argument variable results in fewer runtime errors. The known code assist software development tools are primarily directed to creating source code that compiles cleanly, but by augmenting this with valid variable value information that is not available from the method argument's class definition considerably reduces the occurrences of a processor executing the affected methods from throwing exceptions at runtime which is naturally desirable. Given the prevalence in source code of methods containing arguments taking restricted sets of values from defined ranges of values, the present invention in its first aspect provides a novel and useful contribution to the art.

The subset comprising allowable values may comprise a set of values determined as being acceptable to the application programming interface (API) of the method to which the argument belongs.

Consequently, at runtime, the method argument will take only passed-in values that are valid as determined by the API of the corresponding class method.

The step of identifying code comprising a method argument may comprise a developer manipulating the editor to highlight a graphical or textual representation of the method argument code on a screen display of the editor.

This feature gives a software developer manual control over whether to utilise the code modifying method of the invention for a selected method argument.

Alternatively, the step of identifying code comprising a method argument comprises the editor automatically recognising source code comprising a method argument.

As an automated code identification method, this provides the advantage of ensuring consistency of treatment of method arguments by the same or different software developers.

Method argument code identification could be implemented by the editor through a comparison step whereby sections of the source code being edited are compared to known method argument code templates or any other method argument identification process familiar to a skilled artisan.

Preferably, the editor highlights a graphical or textual representation of the identified method argument code on a screen display thereof.

The editor may invoke a code builder to perform the step of inserting code into the method argument code responsive to the method argument code being identified.

In a preferred implementation of the method in accordance with the invention, the step of inserting code into the method argument code comprises the steps of: invoking a property editor class method associated with the identified method argument to access the method argument variable; invoking a property editor to display a list of allowable values for the method argument variable; invoking a code generating method to return a snippit of source code that can be used to initialise the method argument variable with one of the allowable values; and inserting the snippit of code into the method argument code.

Also, in a preferred implementation, the source code is developed using the Java programming language.

According to a second aspect of the invention, there is provided a system for implementing the method in accordance with the first aspect of the invention.

According to a third aspect of the invention, there is provided a computer having a machine readable medium and a processor for implementing the method in accordance with the first aspect of the invention.

According to a fourth aspect of the invention, there is provided a machine readable medium comprising computer code executable on a processor of a computer in accordance with the third aspect of the invention for implementing the method in accordance with the first aspect of the invention.

BRIEF DESCRIPTION OF THE DRAWINGS

A description of the present invention will follow with reference to the accompanying drawings, of which.

DETAILED DESCRIPTION OF A PREFERRED EMBODIMENT

The foregoing and further features of the present invention will be more readily understood from a description of a preferred embodiment, by way of example thereof, with reference to the accompanying drawings.

Figure 1:
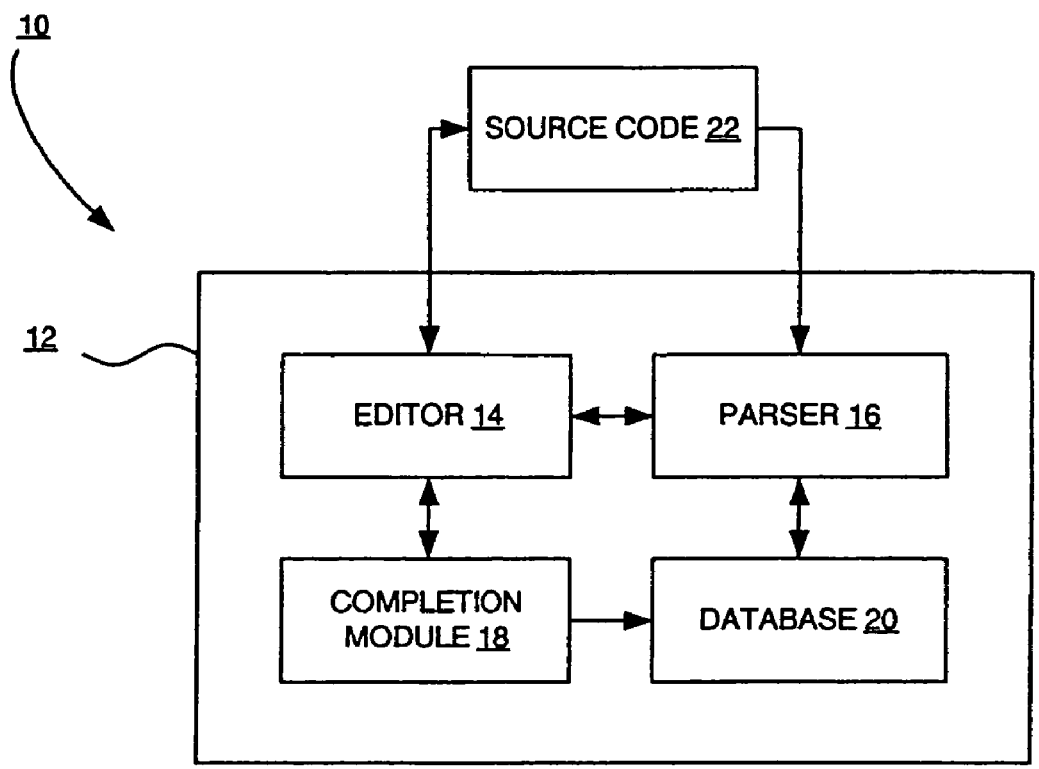
FIG. 1 is a block schematic diagram of a known computer implemented automatic code statement completion system.

Referring firstly to FIG. 1, a known automatic statement completion system is described for comparative purposes and by way of background to the present invention.

The known system 10 includes an IDE 12. The IDE 12 has an editor 14, a parser 16 which may comprise a compiler or an interpreter, a statement completion module 18 and a database 20. The parser 16 may parse source code from source code files 22 under the control of the editor 14. The parser 16 may parse source code from any object oriented language such as Visual Basic, C, C++, Pascal and Java.

The editor 14 enables a software developer to edit existing source code or to write new source code.

The parser 16 can also parse source code being edited or written in accordance with the parsing rules of the applicable object oriented programming language and is arranged such that it can parse incomplete portions of code without throwing errors.

The statement completion module 18 is invoked by the editor 14 on detection of an event such as recognition of a typed in operator or character in the source code being edited or written, actuation of a hot key, manual actuation by the developer through placing a cursor on an icon and clicking a mouse button, for example. The statement completion module 18 seeks to automatically complete certain code statements, expressions or the like as the developer is editing/writing source code.

On detection of an event as aforesaid indicating that statement completion is possible/applicable to the source code portion presently being edited/written by the developer using the editor 14, the editor 14 invokes the parser 16. The parser 16 parses at least the portion of the source code being edited/written to obtain information concerning the code linked to a cursor position of the editor cursor. The parser 16 may access the database 18 to retrieve candidate completion statements which are displayed on an editor screen (not shown) as a pop-up list or drop down menu. The developer may choose any of the listed completion statements as appropriate by highlighting the selected statement in the list. The editor 14 then completes the source code being edited/written by inserting source code corresponding to the selected completion statement in the source code being edited/written at the position of the editor cursor.

The editor 14, parser 16 and statement completion module 18 are software based modules that are computer implemented.

A known statement completion system as described with respect to FIG. 1 is disclosed in U.S. Pat. No. 6,305,008. Further features of the known system and of the means for putting such an automatic code completion system into effect can be obtained from U.S. Pat. No. 6,305,008.

Figure 2:
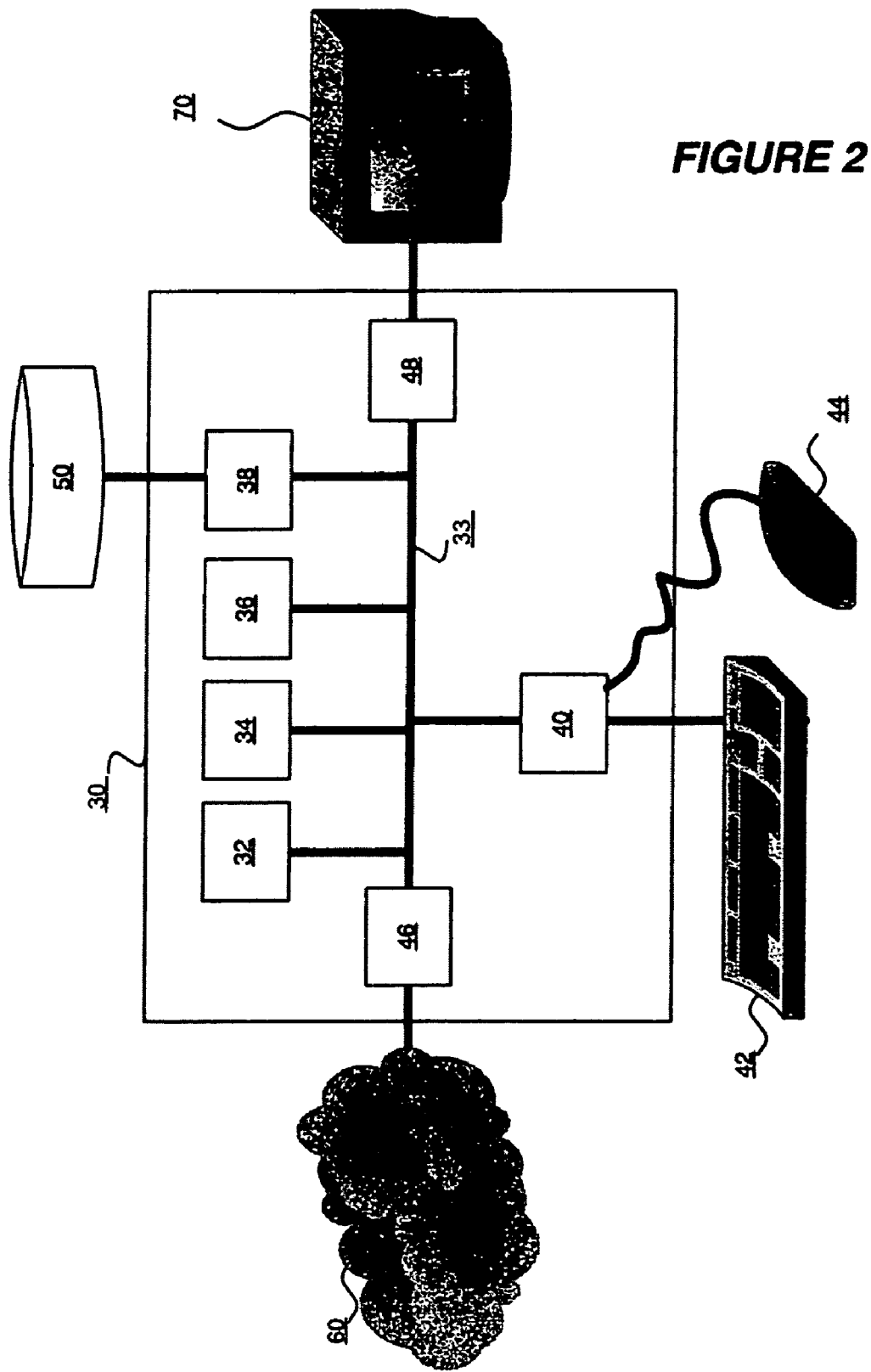
FIG. 2 is a block schematic diagram of a representative hardware and operating environment in which the present invention may be put into effect.

Referring now to FIG. 2, this comprises a representative hardware and operating environment in which the present invention may be put into effect. It comprises a personal computer (PC) 30 such as an IBM compatible personal computer, Apple Macintosh computer or UNIX based workstation. The PC 30 has a central processing unit 32, such as a microprocessor, and a number of other units interconnected via a system bus 33. The PC 30 includes a Random Access Memory (RAM) 34, a Read Only Memory (ROM) 36, an I/O adapter 38 for connecting peripheral devices such as disk storage units 50 to the bus 33, a user interface adapter 40 for connecting a keyboard 42, a mouse 44, and/or other user interface devices such as a touch screen (not shown) to the bus 33, a communication adapter 46 for connecting the PC 30 to a communication network (e.g., a data processing network) 60 and a display adapter 48 for connecting the bus 33 to a monitor or display device 70. The PC 30 typically has resident thereon an operating system such as the Microsoft Windows NT or Windows XP Operating System (OS), the IBM OS/2 operating system, the MAC OS, or UNIX operating system. It will be appreciated that the present invention may also be implemented on other suitable computer platforms and operating systems including distributed computing environments.

Figure 3:
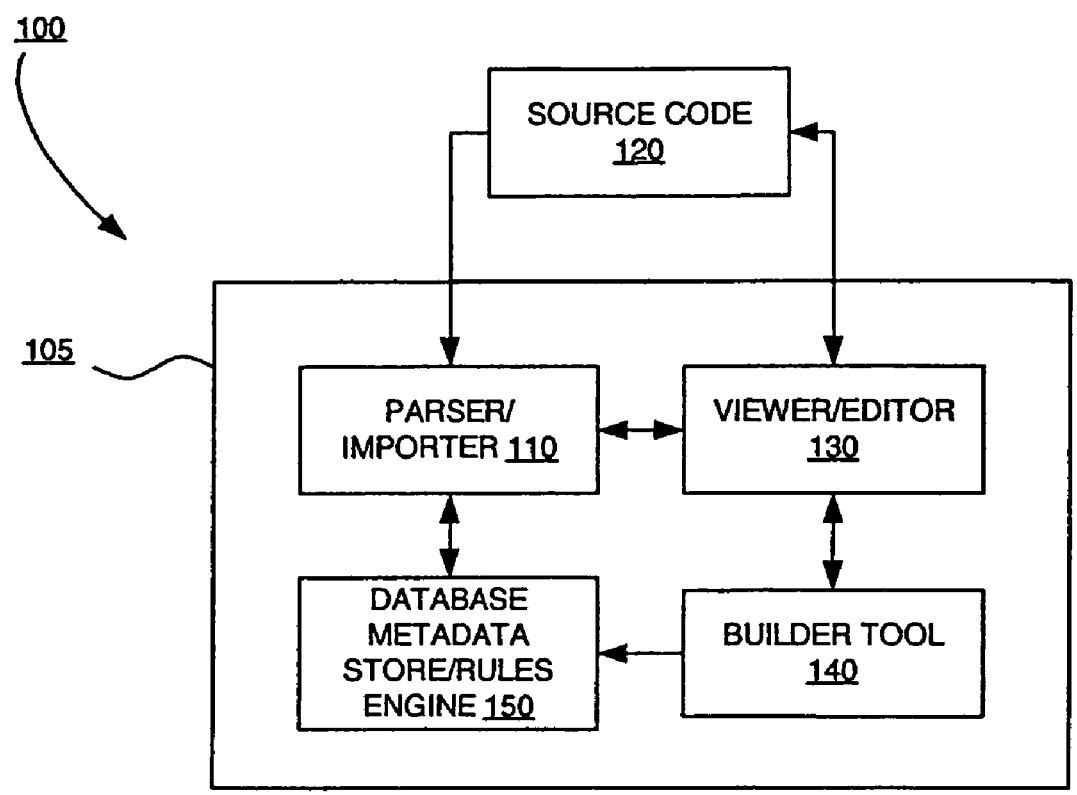
FIG. 3 is a block schematic diagram of a computer implemented automatic content completion of valid values for method arguments system in accordance with a preferred embodiment of the invention.

The preferred embodiment of the invention depicted by FIG. 3 comprises a system 100 including an IDE 105. The IDE 105 includes at least one code parser/importer 110 that can parse source code of source code files 120 and portions of source code being edited/written by a software developer using a code viewer/editor 130. The editor 130 can invoke a code builder tool 140 to perform code statement completion in a known manner or to automatically complete valid values in method arguments in accordance with the method of the invention as will be explained hereinafter. The IDE 105 may include a database 150 for storing data pertaining to candidate completion statements in a known manner and data pertaining to the allowable values of method arguments for use in the method of the invention. As well as a database, completion values not based on the shape of the class may come from metadata that can be associated against the class and its API, or even computed dynamically from a rules engine 150. Thus, the database 150 may be replaced by a metadata store 150 or the rules engine 150. The IDE 105, the parser 110, the editor 130 and the builder tool 140 are software based modules that are computer implemented. These may be implemented on a single PC or workstation as a single application program or a number of integrated application programs or may be implemented on a distributed computing platform as will be familiar to a skilled artisan.

Figure 4:
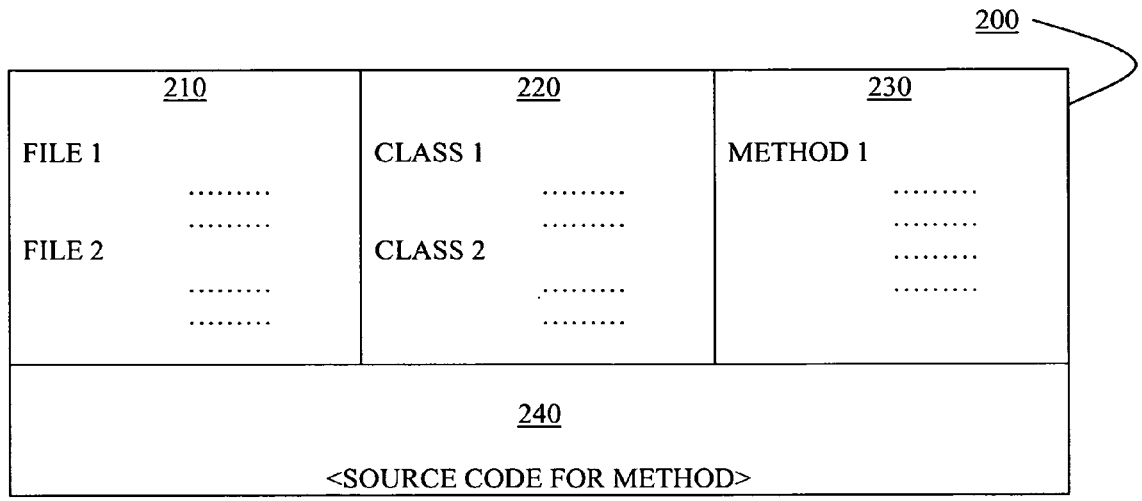
FIG. 4 illustrates a main window displayed by software implementing the preferred embodiment of the invention.

FIG. 4 illustrates an editor display window displayed by software implementing the method in accordance with the preferred embodiment of the invention. Main window 200, which is visible to the developer who is using the major functions of the system 100, includes a file pane 210 that displays a list of source code files 120 in a tree view or the like as will be familiar to those skilled in the art. Each file 120 represents a file that is usable by an object-oriented development system such as IDE 105. The source code files 120 can be written in any object oriented language but, in the following description of the preferred embodiment and method of the invention, the files will be described as having been written in accordance with the Java programming language by way of example. The tree in tree pane 210 can be expanded or contracted in a known fashion to represent one or more files 120. For example, a Java source code file 120 can be expanded to represent all classes and interfaces comprising said file 120.

A relationship pane 220 displays the inheritance relationships between the file 120 selected in file pane 210 and other files with which is associated by inheritance. For example, if a file is selected in file pane 210, all the interfaces within the file 120 and their inheritance relationships will be displayed in relationship pane 220.

A method pane 230 displays a list of methods of a class that is selected in relationship pane 220.

In an edit pane 240, an editor window is displayed that allows the developer to type in or amend the method implementation of a method that is selected in method pane 230. The code for the method implementation is displayed in edit pane 240.

Figure 5A:
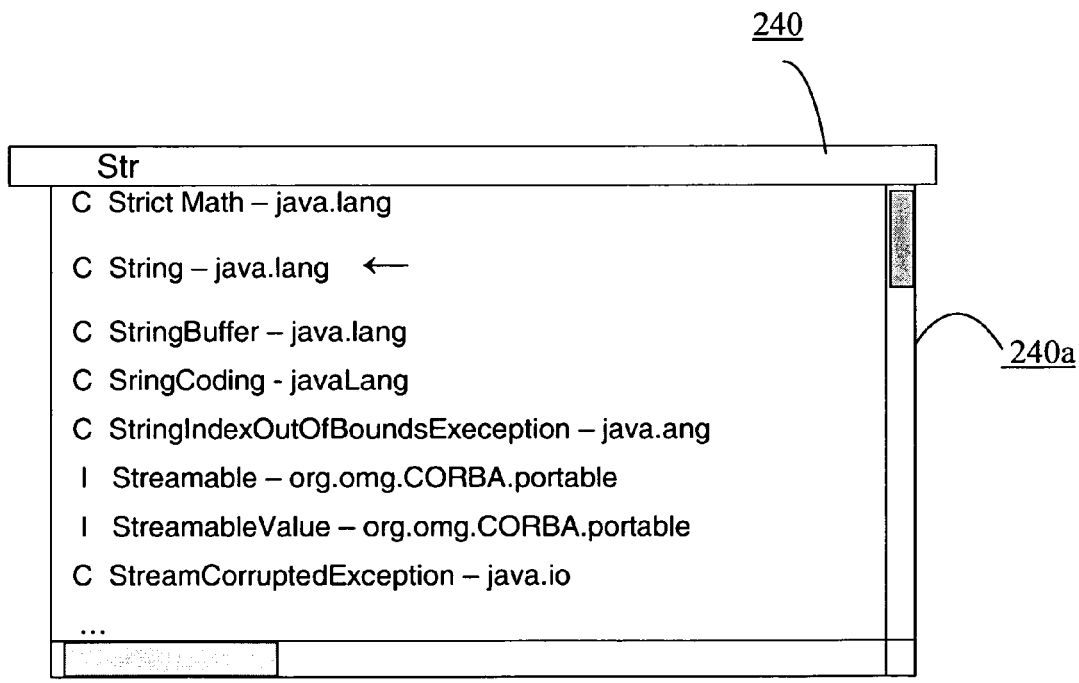
FIGS. 5a and 5b are diagrams of respective representative code assist windows of the preferred embodiment of the invention in which the automatic content completion system of the invention is implementing a known statement completion process.
Figure 5B:
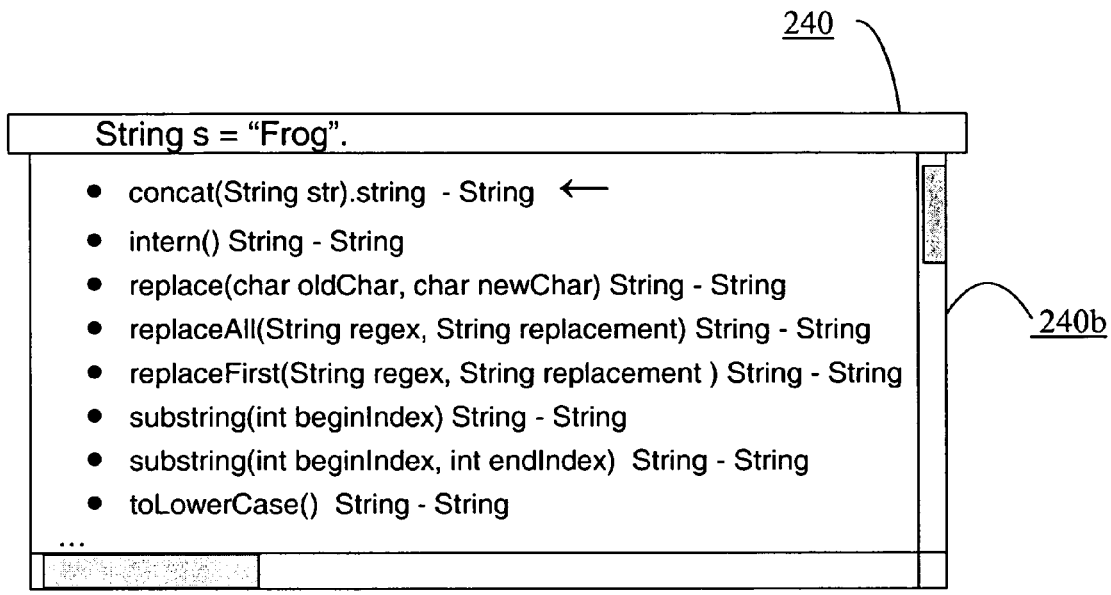

The system 100 can be utilised to implement a code assist or statement completion function in a known manner as hereinbefore described. In this mode of operation, the editor window displayed in the editor pane 240 comprises a code assist window. An example of this mode of operation is illustrated by FIGS. 5a and 5b. Where, for example, the word "Str" has been typed in the editor window 240 as illustrated in FIG. 5a, a candidate list 240a of allowable completions comprising all Java classes and interfaces beginning with "Str" appears in the editor window as a pop-up list or drop-down menu. The developer can scroll the list and select a completion statement, e.g. "String—java.lang" by highlighting (indicated by the arrow in the figure) that statement, for example. The editor 130 inserts the Java source code for the selected completion statement into the source code in the editor window at the position of the editor cursor. Once the code editing/writing process is completed, the updated source code is copied to the source code files 120. Data pertaining to the editing process may be stored in the database 150 for use in future code editing and writing processes.

The candidate items listed in the code assist (editor) window 240 may be populated on a contextual basis in a known manner and may be retrieved from the database 150 or obtained from other sources or means linked to the system 100 such as a metadata store or rules engine following parsing by the builder tool 140 of the source code being edited/written by the developer and possibly also after parsing code from other source files 120.

FIG. 5b illustrates the code assist window 240 invoked against a string object "Frog" in which a list 240b of the available public methods for this object appears. Once again, the developer can scroll the list and select one of said listed public methods.

The code assist function as described so far does not indicate whether any of the possible completion statements in the list is restricted further by information not present in the class definition. For example, a method argument in a class may be defined as a type "int" meaning that it is a variable that can take a value in the defined range 0x80000000 to 0x7fffffff, but the API of the class might be such that the only acceptable values for this method argument are say "0" and "1" representing the values "vertical" and "horizontal", for example. Syntactically, any int value in the defined range of values is correct for source code compilation purposes, but, at runtime, an error may be thrown if an invalid value is passed-in when the method is invoked and executed.

The method in accordance with the invention can be implemented by the system 100 depicted in FIG. 3 and by operating said system generally in a manner similar to the known statement completion process. The method of the invention comprises deriving from metadata definitions the allowable values for a method argument, where said allowable values are a subset or a restricted set of values from a defined range of values for that type of method argument, converting said allowable values into a fragment of Java code that can be used to initialise the argument variable with one of the allowable values when the method is invoked and inserting the fragment of source code into the source code for that method argument using the editor 130 of the IDE 105.

In order to implement the method of the invention, a means of using the editor to identify source code comprising a method argument comprising a variable that takes a range of values can be provided in a number of ways. The method may comprise a developer manually using an editor cursor to highlight source code recognisable as code comprising a method argument of interest. Alternatively, the editor may be arranged to automatically identify method argument source code by comparing the source code portions to code templates stored in the database 150. In this latter case, the editor 130 invokes the parser 110 to conduct the comparison step wherein the parser firstly parses the selected source code to analyse its structure and then retrieves data from the database 150 for the comparison. Alternative methods of identifying method argument code known to the skilled artisan could be employed as alternatives.

Once method argument source code has been identified, the editor 130 invokes the parser 110 to analyse the code. The editor then invokes the builder tool 140 to perform a set of methods on the analysed source code as a means of obtaining a suitable source code fragment (snippit) for inserting into the method source ode where said fragment of code is used on method invocation and execution to initialise the method argument variable with a valid value. The valid value may be chosen from the set of values determined as being acceptable by the API of the class to which the method belongs.

Figure 6:
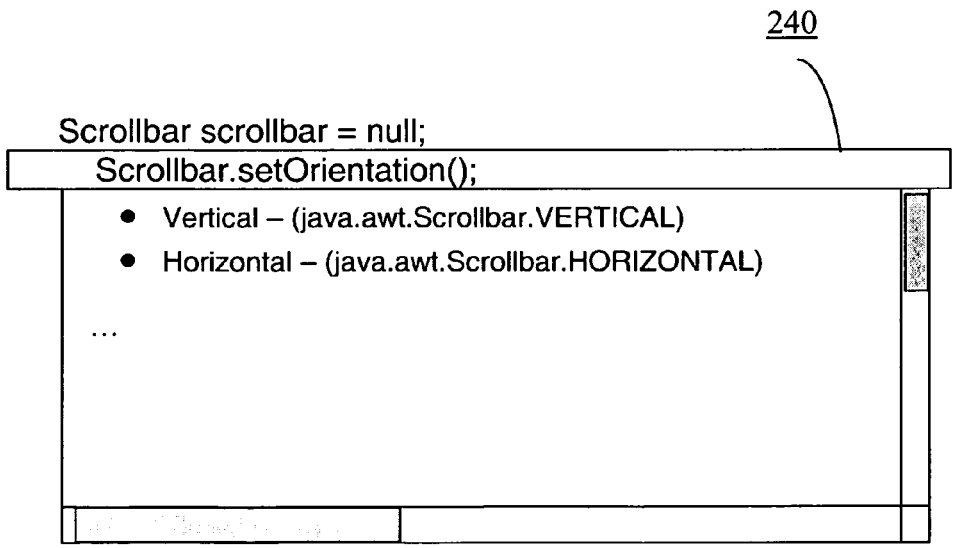
FIG. 6 is a diagram of a representative code assist window of the present invention in which the automatic content completion system of the invention is implementing the method according to the invention.
Figure 7:
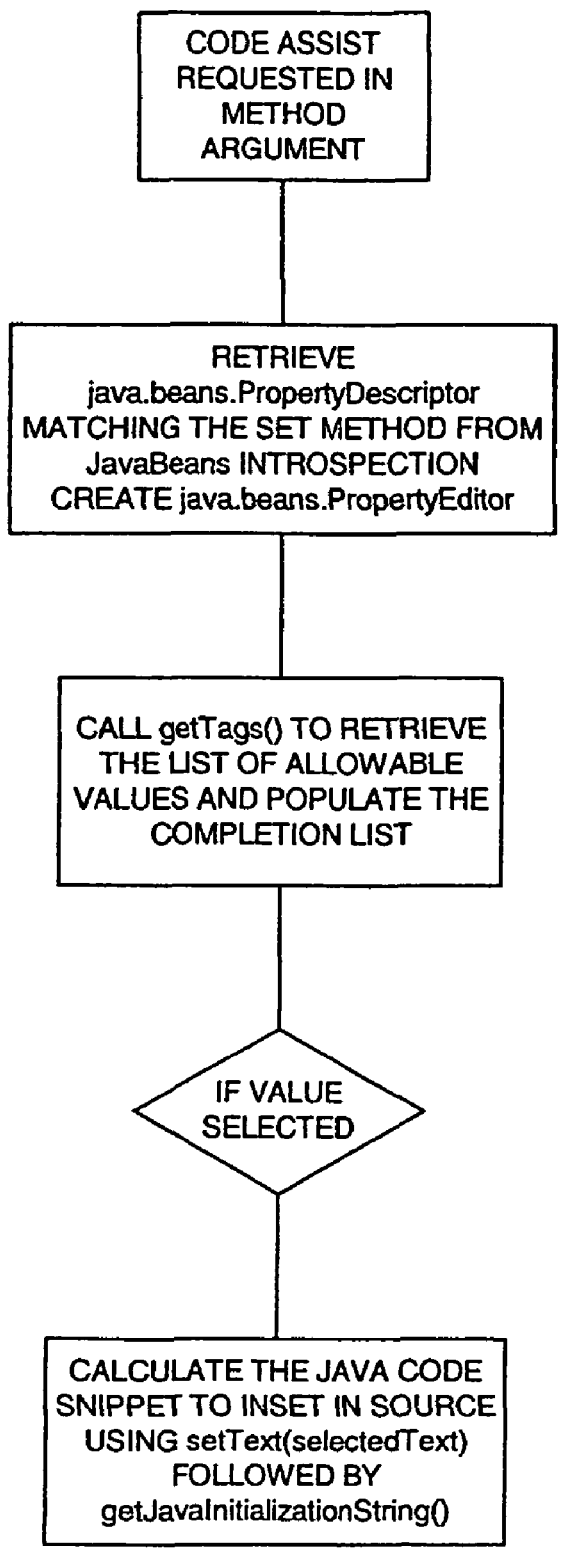
FIG. 7 is a flow diagram of a particular implementation of the method in accordance with the invention utilising BeanInfo metadata for JavaBeans.

FIG. 7 is a flow diagram of the method calls made by the code builder tool 140 in implementing the method of the invention for the example depicted in FIG. 6. FIG. 6 shows how the promptable values for the orientation could include constants VERTICAL and HORIZONTAL. The java.beans.PropertyDescriptor is found for the orientation property through introspection and its property editor class retrieved. The property editor class is normally used to provide support for GUIs that enable developers to edit a property value. Here, it is being employed to obtain the list of allowable values through the display style getTags( ). The builder tool 140 then uses the public get.Javainitialization-String( ) to convert the allowable values into a fragment of Java source code that has the correct language syntax and can be inserted by the editor 130 into the method argument source code being edited/written.

As well as using the JavaBeans specification java.beans.PropertyEditor class to retrieve the list of allowable values, other metadata techniques could be employed such as formatted Java doc describing parameter arguments, metadata tag definitions or other component model data.

The flow diagram of FIG. 7 provides an illustration of a particular implementation of a method in accordance with the invention utilising BeanInfo metadata for JavaBeans. It will be appreciated that the method of the invention may be implemented using any other form of metadata where parameter values can be determined.

There is no existing standard specification for Javadoc method arguments but some conventions do exist. For example, in the Standard Widget Toolkit (SWT) formatted lists exist in comments that could be queried and used to populate the completion values.

In summary, the invention is directed to a method which derives from metadata definitions the allowable values for a method argument, where said allowable values are a subset or a restricted set of values from a defined range of values for that type of method argument. The subset of allowable values is then converted into a fragment of source code that can be used to initialise the argument variable with one of the allowable values when the method is invoked. The fragment of source code is inserted into the source code for that method argument using an editor tool. A system for implementing the method may comprise an integrated development environment (IDE) program.

The invention claimed is:

1. A method for developing source code for a computer program; wherein the method comprises the steps of:
    accessing a portion of source code through a code editor;
    identifying code comprising a method argument, said method argument being of a type that has a defined range of values that are further restricted by information not available from a class definition;
    invoking a property editor class method associated with the identified method argument to access a method argument variable;
    invoking a property editor to display a list of allowable values for the method argument variable;
    invoking a code generating method to return a snippit of source code that can be used to initialise the method argument variable with one of the allowable values; and
    inserting the snippit of code into the method argument code, said inserted code defining allowable values for said method argument, said allowable values comprising a subset of said defined range of values for that type of method argument.

2. The method as claimed in claim 1, wherein the subset comprising allowable values comprises a set of values that is determined as being acceptable to an application programming interface (API) of the method to which the argument belongs.

3. The method as claimed in claim 1, wherein the step of identifying code comprising a method argument comprises a developer manipulating the editor to highlight a graphical or textual representation of the method argument code on a screen display of the editor.

4. The method as claimed in claim 1, wherein the step of identifying code comprising a method argument comprises the editor automatically recognising source code comprising a method argument.

5. The method as claimed in claim 4, wherein the editor highlights a graphical or textual representation of the identified method argument code on a screen display thereof.

6. The method as claimed in claim 1, wherein the editor invokes a code builder to perform the step of inserting code into the method argument code responsive to the method argument code being identified.

7. The method as claimed in claim 1, wherein the source code is developed using the Java programming language.

8. A system for developing source code for a computer program, wherein the system comprises:
    an editor tool for accessing a portion of source code from a source code file;
    means for identifying code comprising a method argument, said means being arranged to identify a method argument of a type that has a defined range of values that are further restricted by information not available from a class definition;
    processor means for invoking a property editor class method associated with the identified method argument to access a method argument variable;
    processor means for invoking a property editor to display a list of allowable values for the method argument variable;
    processor means for invoking a code generating method to return a snippit of source code that can be used to initialise the method argument variable with one of the allowable values; and
    processor means for inserting the snippit of code into the method argument code, said processor means being arranged to insert code defining allowable values for said method argument, said allowable values comprising a subset of said defined range of values for that type of method argument.

9. The system as claimed in claim 8, wherein the code inserting means is arranged to insert code defining a subset of said defined range of values where the subset comprises a set of values that is determined as being acceptable to an application programming interface (API) of the method to which the argument belongs.

10. The system as claimed in claim 8, wherein the editor tool is manually manipulatable to highlight a graphical or textual representation of the method argument code on a screen display of the editor tool.

11. The system as claimed in claim 8, wherein the means for identifying code comprising a method argument comprises the editor tool which is arranged to automatically recognise source code comprising a method argument.

12. The system as claimed in claim 11, wherein the editor tool is arranged to highlight a graphical or textual representation of the identified method argument code on a screen display thereof.

13. The system as claimed in claim 8, wherein the editor tool invokes a code builder tool to perform the step of inserting code into the method argument code responsive to the method argument code being identified.

14. The system as claimed in claim 8, wherein the system is arranged to develop the source code using the Java programming language.

15. A computer for developing source code for a computer program, wherein the computer comprises:
- a machine readable medium for storing program code executable by a processor; and
- an editor tool for accessing a portion of source code from a source code file;
- wherein the processor executes the stored machine code in order to identify code comprising a method argument, said processor being arranged to identify a method argument of a type that has a defined range of values that are further restricted by information not available from a class definition, wherein the processor invokes a property editor class method associated with the identified method argument to access a method argument variable, said processor invokes a property editor to display a list of allowable values for the method argument variable, said processor invokes a code generating method to return a snippit of source code that can be used to initialise the method argument variable with one of the allowable values; and said processor inserting the snippit of code into the method argument code, said inserted snippit of code defining allowable values for said method argument, said allowable values comprising a subset of said defined range of values for that type of method argument.

16. A machine readable medium comprising code executable by a processor of a computer for implementing the steps of:
- accessing a portion of source code through a code editor;
- identifying code comprising a method argument, said method argument being of a type that has a defined range of values that are further restricted by information not available from a class definition;
- invoking a property editor class method associated with the identified method argument to access a method argument variable;
- invoking a property editor to display a list of allowable values for the method argument variable;
- invoking a code generating method to return a snippit of source code that can be used to initialise the method argument variable with one of the allowable values; and
- inserting the snippit of code into the method argument code, said inserted code defining allowable values for said method argument, said allowable values comprising a subset of said defined range of values for that type of method argument.

\* \* \* \* \*